Patented Jan. 5, 1943

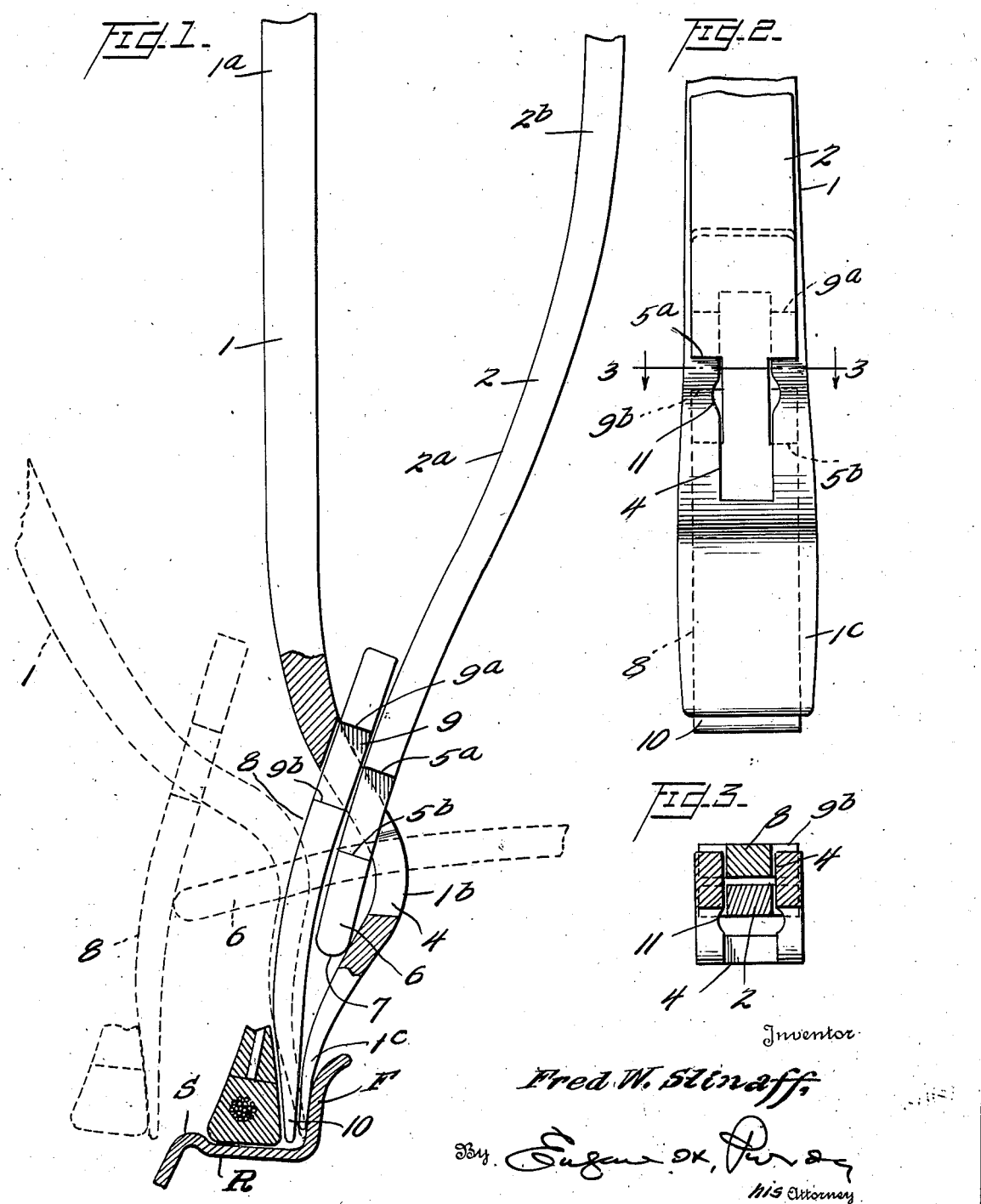

2,307,473

UNITED STATES PATENT OFFICE 2,307,473

TIRE REMOVING TOOL

Fred W. Stinaff, Cuyahoga Falls, Ohio

Application June 13, 1941, Serial No. 397,965

5 Claims. (Cl. 157—6)

This invention relates to tools for facilitating the removal of tires — for example, pneumatic tires of the type used on automobiles—from their rims.

An important object of my invention is to provide a pivoted manually-operable tool of simple and economical construction, the arrangement being such that by exerting a comparatively slight manual pressure upon the handles of a pair of operating levers, a powerful thrust is imparted to the bead of the tire to collapse the tire while at the same time avoiding damage to the tire casing such as frequently occurs in removing tires with the usual tools resulting from the scraping of the tools against the side wall of the tire.

The tool of my invention is especially suitable for removing heavy-duty tires, such as truck tires and tires used on mobile artillery equipment, the demounting of which heretofore has presented a difficult problem because of the effort required to collapse such tires. Moreover, my tire remover is particularly adapted for the removal of tires from that type of rim in which a circumferential locking ridge or hump extends about the rim inwardly of the outer tire bead and normally blocks inward movement of the tire wall. By virtue of the construction and arrangement of my tire remover, a side thrust is imparted to the tire bead in a straight line generally parallel to the circumference of the rim so as to induce the bead to slide up and over the ridge, instead of footing against it, thereby requiring less pressure for removing the tire and also avoiding the danger of mutilating its side wall.

Other objects and advantages will be apparent from the following detailed description of a preferred embodiment of the invention, reference being had to the annexed drawing, in which:

Figure 1 is a side view of the tire removing tool, parts thereof being shown in cross-section;

Figure 2 is a face view of the lower end of the tool viewed from the right-hand side of Fig. 1; and Figure 3 is a transverse cross-sectional view of the tool taken on the lines 3—3 of Fig. 2.

The tire remover shown in Fig. 1 comprises an anchoring lever 1 and a cam lever 2 both made of flat bars of metal pivotally-connected together adjacent their lower ends. The anchoring lever is made straight for the major part of its length and provides a handle portion 1a adjacent its upper end, while its lower end is formed with an arcuate bend 1b terminating in a flat wedge-shaped edge 1c. An elongated slot 4 extends throughout a major portion of the length of the bend 1b.

The cam lever 2 is bowed, as indicated at 2a, its upper end extending generally parallel to the anchoring lever 1 and providing a handle portion 2b. The handles 1a and 1b of the levers are shown broken off at their tops and actually these handles will extend to such length as to afford suitable leverage for easily operating the tool.

Spaced a short distance from its lower end, the cam lever is provided with a pair of rectangular shaped notches 5 upon opposite sides, these notches presenting upper and lower shoulders 5a and 5b respectively. The portion of the cam lever of reduced width passes through the slot 4 of the anchoring lever, and the shoulders constitute abutments for limiting the floating pivotal movement between the two levers.

The extension of the cam lever 2 below its lower shoulders 5b defines a cam section 6 which terminates in a rounded end 7. Overlying the lower end of the cam lever is a tongue 8 made of flat metal. The tongue upon its opposite sides is provided with rectangular shaped notches 9 presenting upper and lower shoulders 9a and 9b, and the narrowed portion of the tongue lying between the notches passes through the slot 4 in the anchoring lever in the same manner as the cam lever 2 so as to form a floating pivoted connection with the anchoring lever. The lower end of the tongue is wedge-shaped, as indicated at 10, and this wedge-shaped end overlies the wedge-shaped end 1c of the anchoring lever, so as to allow these ends to be introduced between the circumferential flange F of a tire rim R and the outer side wall of a pneumatic tire T mounted on the rim.

The parts of the tire remover may be readily assembled and disassembled for convenience in shipping and storing. To assemble the tool it is only necessary to turn the cam lever so that its width extends in the direction of the length of the slot 4 in the anchoring lever, pass it into the slot until its reduced section lies within the opening and then turn the cam lever through an angle of 90 degrees so that its shoulders 5a and 5b overlie the side marginal edges of the slot. After the cam lever has been associated with the anchoring lever, the tongue may be engaged with the slot 4 in a similar manner. To afford sufficient clearance to allow turning the cam lever and shoe through the 90 degree angle above mentioned, the slot is slightly expanded at a point along its length, as indicated at 11 (Fig. 2). To disassemble the tool, the above steps are reversed.

The manner of using my tool is as follows: When a pneumatic tire is to be removed from its rim, the handles of the anchoring lever 1 and cam lever 2 are grasped and held together as indicated in full lines in Fig. 1. The tire first having been deflated, the wedge-shaped ends 1c and 10 of the anchoring lever 1 and tongue 8 are forced downwardly between the bead of the tire T and the upstanding circumferential flange F of the rim R. Now by spreading the handles apart, the levers are rocked about their floating pivotal connection causing the cam section 6 to exert pressure against the tongue 8 and move the tongue laterally, the reaction pressure being resisted by the flange F of the rim against which the anchoring lever engages. Further spreading of the levers into the dotted line position of Fig. 1 causes the lower shoulders 5b on the cam lever to ride along the inner face of the arcuate bend 1b of the anchoring lever and exert a powerful thrust against the tongue, while the tongue is held against rising by reason of the sliding engagement of its lower shoulders 9b with the inner face of the arcuate bend portion of the anchoring lever. Thus the side wall of the tire is collapsed inwardly by a straight compressive force until it drops into the circumferential well provided upon the rim, the tire thereafter being withdrawn from the rim in the usual manner.

Because of the high mechanical advantage afforded by my tire removing tool only comparatively small manual force is required to be exerted in collapsing the tire. This is especially advantageous in the case of heavy-duty tires, such as those used on trucks and mobile artillery equipment, and which heretofore have required considerable time and labor in demounting. In the case of a certain new style of rim in which a circumferential locking ridge (designated S in Fig. 1) is provided inwardly of the outer side wall of the tire, difficulty is encountered with the usual tire removing tools in forcing the tire bead over this ridge. Since my tool exerts a straight sidewise pressure against the tire, the bead throughout a portion of its periphery will slide up and over this ridge with comparatively little resistance. There being practically no relative movement between the tool and the tire, the danger of scuffing or otherwise injuring the side wall is thus avoided.

My tool may be turned out rapidly and cheaply by a few simple punching and stamping operations, so that it lends itself admirably to manufacture by quantity production methods.

Obviously various changes may be made in the form of the device described above provided said changes come within the scope of the claims.

I claim:

1. A tire removing tool comprising an anchoring lever and a cam lever, a floating pivotal connection between said levers adjacent their lower ends, the upper ends of said levers providing handles for manually swinging said levers about their pivotal connection, the lower end of the anchoring lever being adapted to be inserted between the side of a tire and the outer circumferential flange of a rim and the lower end of the cam lever terminating above the lower end of the anchoring lever and providing a cam section, a tongue overlying the cam section and the lower end of the anchoring lever, and a floating pivotal connection between said tongue and anchoring lever, whereby spreading the handles of the levers causes the cam section to bear against said tongue and urge it into engagement with the tire.

2. A tire removing tool comprising an anchoring lever and a cam lever, an arcuate bend provided upon said anchoring lever adjacent its lower end, abutments adjacent the lower end of the cam lever overlying and adapted to slidably engage the inner face of said arcuate bend and providing a loose pivotal connection with the anchoring lever, the upper ends of said levers providing handles for manually swinging said levers about their pivotal connection, the lower end of the anchoring lever being adapted to be inserted between the side of a tire and the outer circumferential flange of a rim and the lower end of the cam lever terminating above the lower end of the anchoring lever and providing a cam section, a tongue overlying the cam section and the lower end of the anchoring lever, and abutments upon said tongue adapted to slidably engage the inner face of said arcuate bend and providing a loose pivotal connection with the anchoring lever, whereby spreading the handles of the levers causes the abutments upon the cam lever and the tongue to slide along the inner face of the arcuate bend and urge the tongue into engagement with the tires.

3. A tire removing tool comprising an anchoring lever and a cam lever, an arcuate bend provided upon said anchoring lever adjacent its lower end, an elongated slot opening through the bend and extending lengthwise thereof, the lower end of the cam lever passing through said slot and having shoulders adapted to slidably engage the inner face of the bend so as to provide a loose pivotal connection with said anchoring lever, the upper ends of said levers providing handles for manually swinging said levers about their pivotal connection, the lower end of the anchoring lever being adapted to be inserted between the side of a tire and the outer circumferential flange of a rim and the lower end of the cam lever terminating above the lower end of the anchoring lever and providing a cam section, and a tongue overlying the cam section and the lower end of the anchoring lever, said tongue passing through said slot and having shoulders adapted to slidably engage the inner face of the bend so as to provide a loose pivotal connection with the anchoring lever, whereby spreading the handles of the levers causes the shoulders upon the cam lever and the tongue to slide along the inner face of the arcuate bend and urge the tongue into engagement with the tire.

4. A tire removing tool comprising an anchoring lever and a cam lever, an arcuate bend provided upon said anchoring lever adjacent its lower end, an elongated slot opening through the bend and extending longitudinally thereof, the lower end of the cam lever being notched upon its opposite sides to produce a portion thereof of restricted width terminating in laterally-disposed shoulders, said restricted portion freely passing through and beyond the slot and having its shoulders arranged to engage opposite faces of the bend adjoining the slot, the upper ends of said levers providing handles for manually swinging said levers about the pivotal connection formed by the intersection of the cam lever with the slot, the lower end of the anchoring lever being so shaped as to be inserted between the side of a tire and the outer circumferential flange of a rim, and the lower end of the cam lever terminating above the lower end of the anchoring lever and providing a cam section, and a tongue overlying the cam section and the lower end of the anchoring lever, said tongue being notched upon its opposite sides to produce a portion of restricted width terminating in laterally-disposed shoulders, said restricted portion passing through and beyond the slot and having its shoulders arranged to engage opposite faces of the bend adjacent the slot so as to provide a loose pivotal connection with the anchoring lever, whereby spreading the handles of the levers causes the shoulders upon the cam lever and the tongue to slide about the arcuate bend and urge the tongue into engagement with the tire.

5. A tire removing tool comprising an anchoring lever and a cam lever, an arcuate bend provided upon said anchoring lever adjacent its lower end, an elongated slot opening through the bend and extending longitudinally thereof, the lower end of the cam lever being notched upon its opposite sides to produce a portion thereof of restricted width terminating in laterally-disposed shoulders, said restricted portion freely passing through and beyond the slot and having its shoulders arranged to engage opposite faces of the bend adjoining the slot, the upper ends of said levers providing handles for manually swinging said levers about the pivotal connection formed by the intersection of the cam lever with the slot, the lower end of the anchoring lever being so shaped as to be inserted between the side of a tire and the outer circumferential flange of a rim, and the lower end of the cam lever terminating above the lower end of the anchoring lever and providing a cam section, and a tongue overlying the cam section and the lower end of the anchoring lever, said tongue being notched upon its opposite sides to produce a portion of restricted width terminating in laterally-disposed shoulders, said restricted portion passing through and beyond the slot and having its shoulders arranged to engage opposite faces of the bend adjacent the slot so as to provide a loose pivotal connection with the anchoring lever, whereby spreading the handles of the lever causes the shoulders upon the cam lever and the tongue to slide about the arcuate bend and urge the tongue into engagement with the tire, said slot exceeding in length the width of the cam lever and tongue and having an expanded portion intermediate its length to permit assembly and disassembly of the cam lever and tongue from the anchoring lever by turning said cam lever and tongue so that their widths are disposed lengthwise of the slot.

FRED W. STINAFF.